United States Patent
Mack

(10) Patent No.: US 7,156,402 B2
(45) Date of Patent: Jan. 2, 2007

(54) QUICK-TIGHTEN DRILL CHUCK

(75) Inventor: Hans-Dieter Mack, Sontheim (DE)

(73) Assignee: Rohm GmbH & Co. KG, Darmstadt (DE)

( * ) Notice: Subject to any disclaimer, the term of this patent is extended or adjusted under 35 U.S.C. 154(b) by 316 days.

(21) Appl. No.: 10/681,775

(22) Filed: Oct. 8, 2003

(65) Prior Publication Data

US 2005/0023774 A1    Feb. 3, 2005

(30) Foreign Application Priority Data

Jul. 31, 2003    (DE) ................. 103 35 500

(51) Int. Cl.
*B23B 31/16*    (2006.01)
(52) U.S. Cl. .................. 279/60; 279/140; 279/902
(58) Field of Classification Search ............ 279/60–62, 279/56, 59, 140, 902
See application file for complete search history.

(56) References Cited

U.S. PATENT DOCUMENTS

| | | | | |
|---|---|---|---|---|
| 893,348 | A * | 7/1908 | Morrow ........................ | 279/60 |
| 1,159,248 | A * | 11/1915 | Morrow ........................ | 279/60 |
| 2,253,345 | A * | 8/1941 | Palmgren ..................... | 279/60 |
| 4,302,021 | A * | 11/1981 | Rohm .......................... | 279/60 |
| 4,456,270 | A * | 6/1984 | Zettl, Jr. et al. .............. | 279/62 |
| 4,563,013 | A * | 1/1986 | Hunger et al. ................ | 279/64 |
| 4,695,065 | A * | 9/1987 | Komatsu et al. .............. | 279/60 |
| 5,031,925 | A * | 7/1991 | Tatsu et al. ................... | 279/64 |
| 5,765,839 | A * | 6/1998 | Rohm .......................... | 279/62 |
| 5,918,886 | A * | 7/1999 | Horiuchi et al. .............. | 279/58 |

FOREIGN PATENT DOCUMENTS

| | | |
|---|---|---|
| DE | 31 14 503 | 11/1982 |
| DE | 3713457 C1 * | 9/1988 |
| DE | 93 12 839 | 12/1993 |
| DE | 94 09 258 | 9/1994 |

* cited by examiner

*Primary Examiner*—Monica Carter
*Assistant Examiner*—J Williams
(74) *Attorney, Agent, or Firm*—Andrew Wilford

(57) ABSTRACT

A drill chuck has a chuck body centered on and rotatable about an axis and having a screwthread, a main sleeve axially fixed but rotatable about the axis on the body and formed centered on the axis with a plurality of angled forwardly open guides, and respective clamping jaws displaceable in the guides. A pusher axially engageable with clamping jaws is axially forwardly displaceable relative to the chuck body to shift the clamping jaws axially forward and radially inward in the respective guides and axially rearwardly displaceable relative to the chuck body to shift the clamping jaws axially rearward and radially outward in the respective guides. A coupling jaw threadedly engaging the screwthread of the chuck body is engageable with the pusher for axially coupling the coupling jaw to the pusher. The sleeve is coupled positively to the coupling jaw for joint rotation therewith.

12 Claims, 6 Drawing Sheets

QUICK-TIGHTEN DRILL CHUCK

FIELD OF THE INVENTION

The present invention relates to chuck. More particularly this invention concerns quick-tighten drill chuck.

BACKGROUND OF THE INVENTION

A basic type of drill chuck has a chuck body or sleeve rotatable about an axis and formed with three angled guides equispaced about the axis. Respective jaws in the guides can bear rearwardly on an axially displaceable pusher for movement axially forward and radially together and opposite movement axially back and radially apart. The radially and axially displaceable jaws, pusher, and chuck body are all rotationally linked. An axially rearwardly projecting threaded stem on the pusher fits in a nut that is rotatable about the axis but axially fixed.

As described in German utility model 93 12 839 published 9 Dec. 1993, a key-operated driver gear can rotate this nut to move the pusher and jaws axially forward and back. In German patent 3,114,503 of E. Wezel the nut is fixed on the actual drive spindle so that normal forward rotation of the spindle relative to the chuck sleeve will move the jaws axially forward and radially inward, and opposite rotation relative to the sleeve will loosen them, so that for tightening or loosening it is necessary to relatively rotate the chuck sleeve and the drive spindle.

Such a chuck can be provided with quick-tightening action, that is the ability to tighten the jaws onto a tool or loosen them from a tool by a few turns of a part of the chuck, regardless of the size of the tool. This is done as described in German utility model 94 09 258 published 15 Sep. 1994 by providing radially displaceable coupling jaws that are carried on the nut and that can be moved between a coupling position engaging the pusher and coupling it to the actuating member, and a decoupling position permitting the actuating member and pusher to move axially relative to each other. The nut here is axially fixed in the chuck sleeve and rotated by a small key-driven gear. When the nut is rotated forward, the jaws are cammed inward into engagement with the stem so as to couple the nut to the pusher and transmit further forward movement of the nut to the pusher. When rotated backward, the jaws pull out of engagement with the pusher and free it. This movement can take irrespective of the axial position of the pusher so that a few turns in one directions tightens the chuck and a few in the opposite loosens it, regardless of the diameter of the tool shank held in the jaws.

Such a system is fairly complex and are not intuitive in operation. It is necessary to use a key for the final tightening and initial loosening of the chuck. The only real time saver is that, once the jaws and pusher are decoupled from the nut, a tool of any diameter can be pushed between the jaws which will move against spring force to accommodate the tool.

OBJECTS OF THE INVENTION

It is therefore an object of the present invention to provide an improved quick-tighten chuck.

Another object is the provision of such an improved quick-tighten chuck which overcomes the above-given disadvantages, that is which is easier to operate than the prior-art such chucks.

SUMMARY OF THE INVENTION

A drill chuck has according to the invention a chuck body centered on and rotatable about an axis and having a screwthread, a main sleeve axially fixed but rotatable about the axis on the body and formed centered on the axis with a plurality of angled forwardly open guides, and respective jaws displaceable in the guides. A pusher axially engageable with jaws is axially forwardly displaceable relative to the chuck body to shift the jaws axially forward and radially inward in the respective guides and axially rearwardly displaceable relative to the chuck body to shift the jaws axially rearward and radially outward in the respective guides. A jaw threadedly engaging the screwthread of the chuck body is engageable with the pusher for axially coupling the jaw to the pusher. The sleeve is coupled positively to the jaw for joint rotation therewith.

Such a chuck, when installed on a standard reversible drive unit, allows the tool to be chucked and dechucked easily simply by gripping the sleeve and operating the drive unit in the forward direction for tightening and the reverse direction for loosening. This a wholly intuitive and standard operation method, but here is effective on a quick-tighten mechanism where, regardless of tool diameter, the chuck tightens and releases with only a few turns. The user accustomed to standard chuck operation will not have to learn any new procedure for the quick-tighten chuck of this invention.

According to the invention a cam ring is provided between the sleeve and the jaw and forms the coupling therebetween. More particularly a radial projection on the jaw is fitted to a radially open seat on the ring. Such a ring bridges radially between the jaw and the sleeve and also has the cam formations that move the jaw between its coupled and decoupled positions with the pusher.

A spring braced between the chuck body and the pusher urges the pusher and jaws axially forward. Thus, presuming the chuck is empty, the user can fit a tool to it simply by pressing it back against the jaws. This action will push the jaws and pusher axially backward until the tool can fit between the jaws. Thereafter the actual clamping action is initiated.

The pusher according to the invention has an axially rearwardly projecting stem and the ring has a front radially inwardly projecting ridge closely surrounding the stem and keeping the stem centered on the axis. Thus the chuck can be made quite short since it axially overlaps the jaws. In addition the ridge forms an abutment for the jaws that prevents them from moving too far forward.

The jaw and pusher are formed with radially projecting and interengaging teeth. The teeth of the pusher are formed by a screwthread of the same hand as the screwthread between the jaw and the chuck body.

The cam ring is formed with a large- and small-diameter axially spaced generally cylindrical cam surfaces and a generally frustoconical cam surface connecting the cam surfaces. The jaw has a radially deflectable end engageable with the pusher and riding on the cam surfaces. The cylindrical cam surfaces are dimensioned such that the jaw teeth engage the pusher teeth when the jaw is engaging the small-diameter cam surface but not when engaging the large-diameter cam surface. Thus simple axial displacement of the jaw caused by rotating the chuck body relative to it can move the jaw between the coupling position engaging the pusher and the decoupling position out of engagement with the pusher. The small-diameter cam surface is dimensioned such that, when engaged by the jaw, the jaw teeth can slide angularly in the pusher teeth. The screwthread actuation of the jaw has a self-tightening effect in that normal forward-rotation drilling will inherently tighten the jaws on the tool.

In accordance with the invention a bumper element is provided between the cam ring and the chuck body. This bumper element prevents the jaw from self-tightening to a point where it is difficult to dechuck the tool.

The drill chuck further has according to the invention means for locking the sleeve against rotating in one direction relative to the chuck body. Such locking means includes a locking sleeve angularly but not axially displaceable on the main sleeve, an annular array of teeth on the chuck body, and a locking member carried in the locking sleeve and cammable thereby between a locking position engaged in the array of teeth and a freeing position clear of the array of teeth. Such a system is used like a standard chuck, that is the sleeve is arrested by hand while the drive unit is run in the forward direction. Once a predetermined torque is exceeded, the locking means comes into effect and prevents reverse rotation of the sleeve. On reverse driving, the locking means is first decoupled, whereupon further reverse rotation pulls the jaw out of engagement with the pusher, freeing it.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
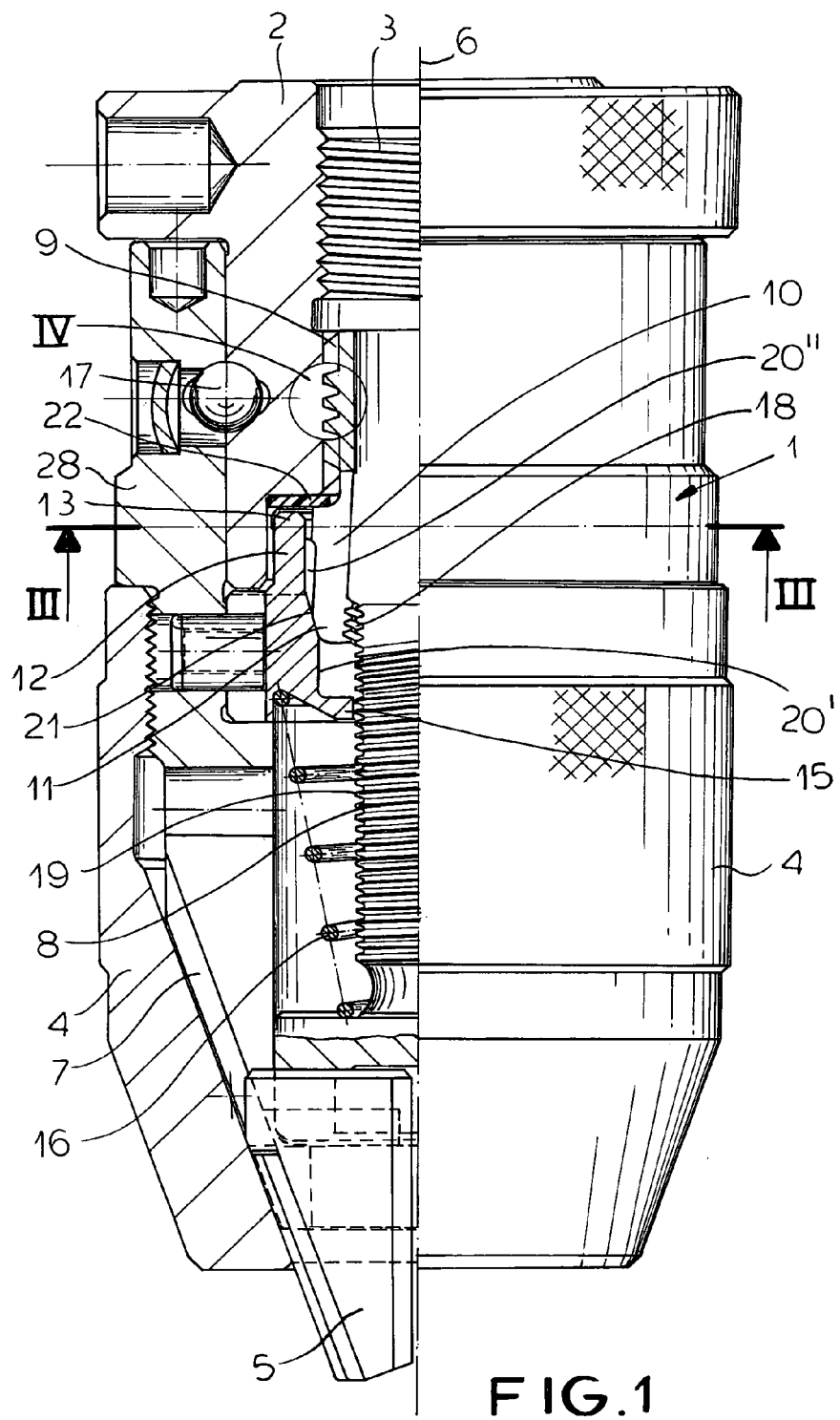
FIG. 1 is a side view partly in axial section through a chuck according to the invention.

As seen in FIGS. 1–4 a chuck 1 according to the invention has a body 2 centered on and rotatable about an axis 6 by an unillustrated drive spindle fitted into an axially rearwardly open threaded bore 3 in the body 2. A two-part sleeve 4 surrounds and projects past the front end of the body 2 with a roller bearing 17 fitted to a rear part 28 of the sleeve 4 and allowing the sleeve 4 to rotate on the body 2 but not move axially relative to it. At its front end the sleeve 4 is formed as is conventional with three angularly equispaced angled guide grooves 7 each holding a respective jaw 5.

An axially displaceable pusher 8 has a front end bearing on and rotationally coupled to the clamping jaws 5, which themselves are rotationally coupled by the guides 7 to the sleeve 4. A spring 16 bears axially forward on the pusher 8 and axially rearward on the sleeve 4 and body 2. Thus the sleeve 4, clamping jaws 5, and pusher 8 are all rotationally coupled to each other, the clamping jaws 5 are axially coupled but radially displaceable relative to the pusher 8, and the clamping jaws 5 are slidable along the angled guides 7 of the sleeve 4. Thus when the pusher 8 and clamping jaws 5 move axially forward (down in FIG. 1), the clamping jaws 5 move radially inward, sliding on the guides 7 and pusher 8. Axial rearward movement of the pusher 8 and clamping jaws 5 moves the clamping jaws 5 radially apart.

Coupling jaws 10 angularly spaced about the axis 6 have rear ends coupled to teeth formed by a screwthread 9 (FIG. 4 also) to the driven chuck body 2 and radially deflectable front ends 11 having teeth 18 fittable with a screwthread 19 formed on the rear stem end of the pusher 8. The screwthread 19 is of the same hand but lower pitch as the screwthread 9. The jaws 10 are formed, like a collet chuck, as axially forwardly projecting fingers carried on a cylindrically tubular sleeve itself forming the screwthread 9.

Figure 3:
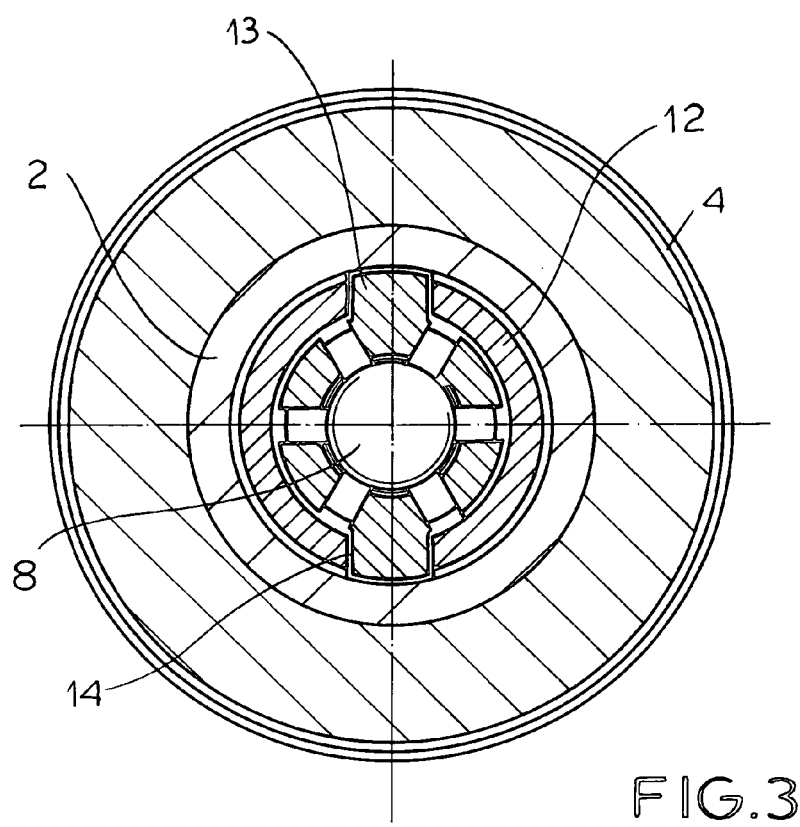
FIG. 3 is a section taken along line III—III of FIG. 1.
Figure 4:
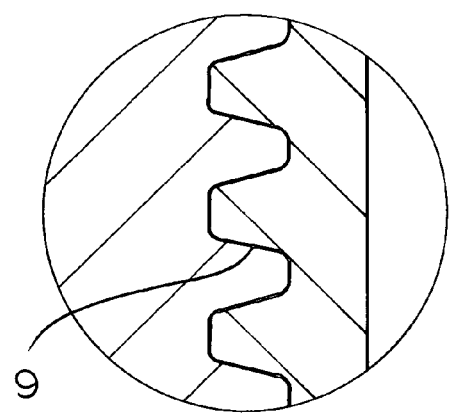
FIG. 4 is a large-scale view of the detail indicated at IV in FIG. 1.

A cam ring 12 rotationally couples the coupling jaws 10 to the sleeve 4 and serves as the rear abutment for the spring 16, to which end as shown in FIG. 3 the jaws 10 have radially outwardly projecting coupling pins 13 seated in axially and radially open slots 14 of the cam ring 12. At its front end the cam ring 12 has a radially inwardly projecting centering ridge or ring 15 closely surrounding the pusher 8 and keeping it perfectly centered on the axis 6. This ring 12 is internally formed with a front small-diameter cylindrical cam surface 20', a rear large-diameter cylindrical cam surface 20", and a frustoconical cam surface 21 between the surfaces 20' and 20". The jaw front ends 11 bear radially outward on the surfaces 20', 20", and 21 and the diameters of the surfaces 20' and 20" are such that as the coupling jaws 10 are shifted axially from the rear surface 20' over the surface 21 to the front surface 20', the ends 11 are cammed inward to press the teeth 18 of these ends 11 into mesh with the screwthread 19, and axially rearward shifting disengages the teeth 18 from the screwthread 19.

Thus starting from the position of FIG. 1, rotation of the body 2 relative to the sleeve 4 will displace the coupling jaws 10 axially forward. Their front ends 11 will move from a position with their teeth 18 out of mesh with the screwthread 19 to a position meshing with this screwthread 19. More relative forward rotation of the body 2 relative to the sleeve 4 will advance the pusher 8 forward and tighten the clamping jaws 5 on an unillustrated tool shank. Subsequent reverse rotation of the chuck body 2 relative to the sleeve 4 will shift the coupling jaws 10 axially backward until their ends 11 slide down the surface 21 to the surface 20" and leave engagement with the screwthread 19, thereby freeing the pusher 8 to move axially.

Figure 2:
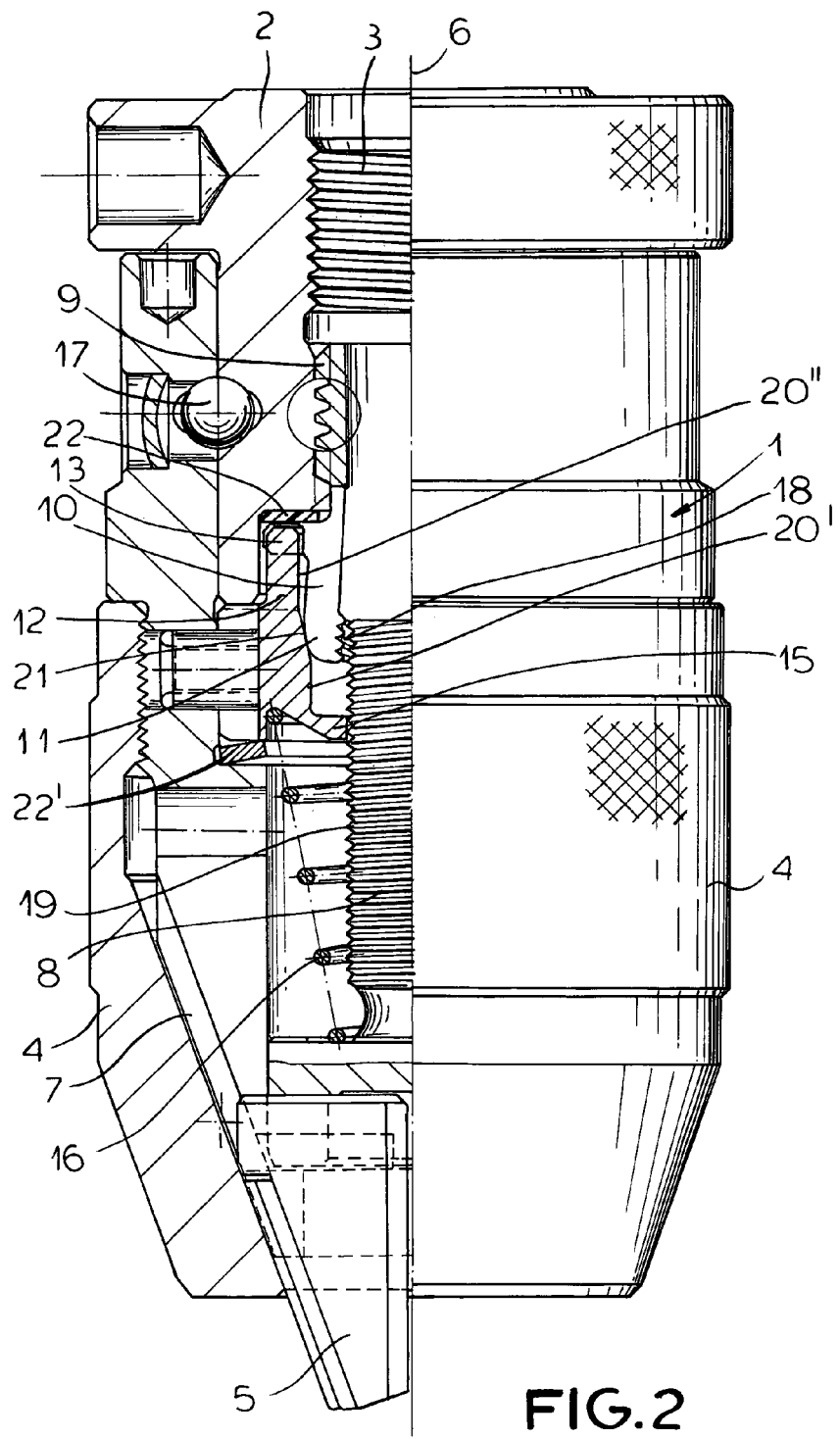
FIG. 2 is a view like FIG. 1 of a variant on the chuck of FIG. 1.

The cam ring 12 in FIGS. 1 and 2 is braced rearwardly by a compressible washer 22 against the chuck body 2. In FIG. 2 only another spring washer 22' is provided between the front end of the ring 12 and the sleeve 4.

Figure 5:
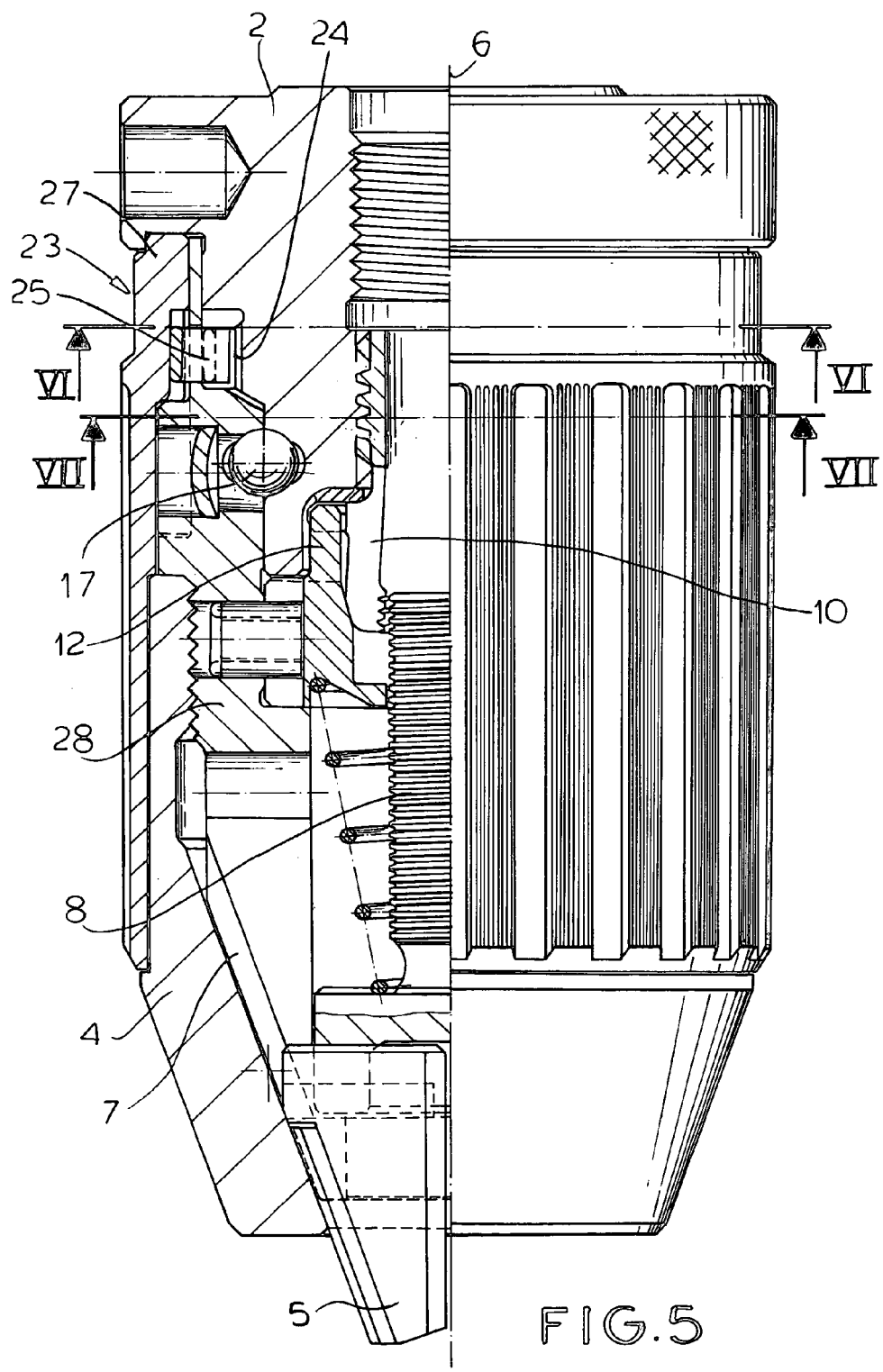
FIG. 5 is a view like FIG. 1 of another chuck according to the invention.
Figure 6:
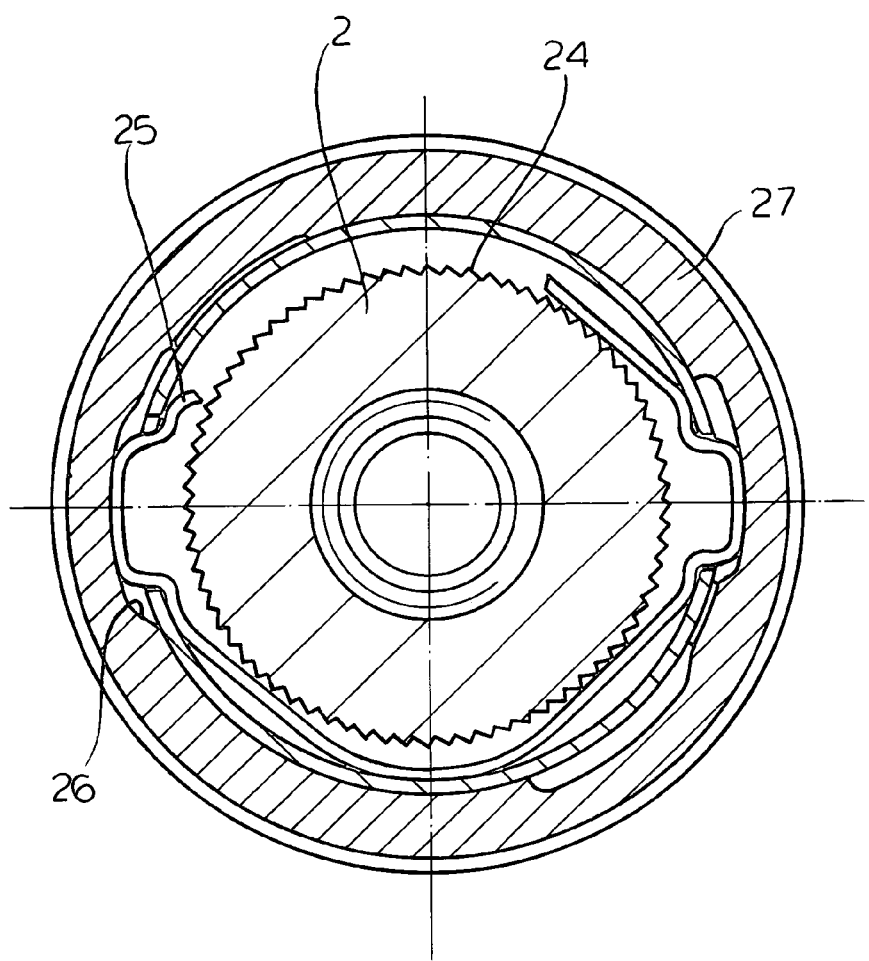
FIGS. 6 and 7 are sections taken along respective lines VI—VI and VII–VI of FIG. 5.
Figure 7:
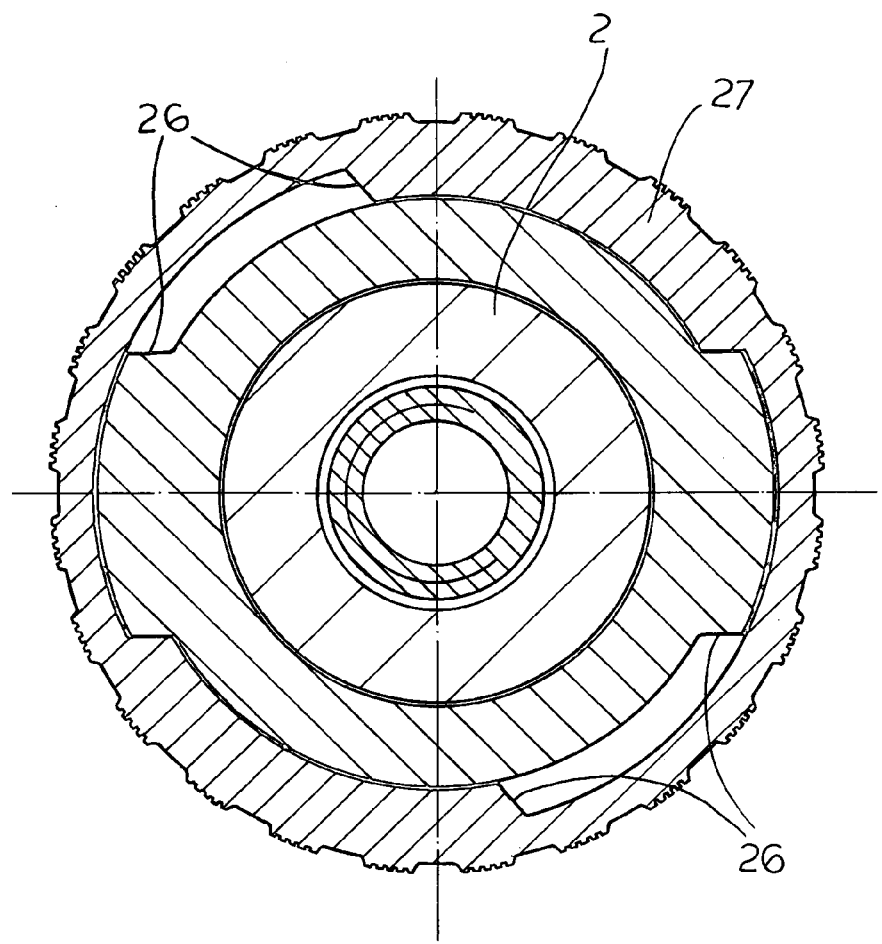

The chuck of FIGS. 5 through 7 has a latching system 23 comprised of an annular row of radially outwardly directed sawteeth 24 formed on the chuck body 2 and a locking member 25 movable by cam formations 26 between an outer position clear of the teeth and an inner position engaged in the teeth 24. The locking member 25 is rotationally coupled to an outer locking sleeve 27 axially nondisplaceable on the sleeve 4 but limitedly rotatable on the sleeve 4. Thus rotation of the locking sleeve 27 in one direction will move the locking member 25 inward, only allowing forward rotation of the chuck body 2 relative to the sleeve 4, with ratcheting of its tip on the sawteeth 24, while preventing any opposite rotation. Thus when locked the chuck can be tightened but will not loosen. Only when the sleeve 27 is reverse rotated to allow the tip of the member 25 to leave contact with the teeth 24 can such reverse loosening rotation take place.

What is claimed is:

1. A drill chuck comprising:
a chuck body centered on and rotatable about an axis and having a screwthread;
a main sleeve axially fixed but rotatable about the axis on the body and formed centered on the axis with a plurality of angled forwardly open guides;
respective clamping jaws displaceable in the guides;
a pusher axially engageable with clamping jaws and axially forwardly displaceable relative to the chuck body to shift the clamping jaws axially forward and radially inward in the respective guides and axially rearwardly displaceable relative to the chuck body to shift the clamping jaws axially rearward and radially outward in the respective guides;
a coupling jaw threadedly engaging the screwthread of the chuck body, engageable with the pusher for axially coupling the coupling jaw to the pusher, and having a deflectable front end; and
means for coupling the sleeve to the coupling jaw for joint rotation therewith.

2. A drill chuck comprising:
a chuck body centered on and rotatable about an axis and having a screwthread;
a main sleeve axially fixed but rotatable about the axis on the body and formed centered on the axis with a plurality of angled forwardly open guides;
respective clamping jaws displaceable in the guides;
a pusher axially engageable with clamping jaws and axially forwardly displaceable relative to the chuck body to shift the clamping jaws axially forward and radially inward in the respective guides and axially rearwardly displaceable relative to the chuck body to shift the clamping jaws axially rearward and radially outward in the respective guides;
a coupling jaw threadedly engaging the screwthread of the chuck body and engageable with the pusher for axially coupling the coupling jaw to the pusher; and
means including a cam ring between the sleeve and the coupling jaw for coupling the sleeve to the coupling jaw for joint rotation therewith.

3. The drill chuck defined in claim 2 wherein the means includes a radial projection on the coupling jaw and a radially open seat on the ring receiving the projection.

4. The drill chuck defined in claim 2, further comprising a spring braced between the chuck body and the pusher urging the pusher and clamping jaws axially forward.

5. The drill chuck defined in claim 2 wherein the pusher has an axially rearwardly projecting stem and the ring has a front radially inwardly projecting ridge closely surrounding the stem and keeping the stem centered on the axis.

6. The drill chuck defined in claim 2 wherein the coupling jaw and pusher are formed with radially projecting and interengaging teeth.

7. The drill chuck defined in claim 6 wherein the teeth of the pusher are formed by a screwthread of the same hand as the screwthread between the coupling jaw and the chuck body.

8. The drill chuck defined in claim 6 wherein the cam ring is formed with large-diameter and small-diameter axially spaced generally cylindrical cam surfaces and a generally frustoconical cam surface connecting the cam surfaces, the coupling jaw having an end engageable with the pusher and riding on the cam surfaces, the cylindrical cam surfaces being dimensioned such that the jaw teeth engage the pusher teeth when the coupling jaw is engaging the small-diameter cam surface but not when engaging the large-diameter cam surface.

9. The drill chuck defined in claim 8 wherein the small-diameter cam surface is dimensioned such that, when engaged by the coupling jaw, the jaw teeth can slide angularly in the pusher teeth.

10. The drill chuck defined in claim 6, further comprising a bumper element between the cam ring and the chuck body.

11. A drill chuck comprising:
a chuck body centered on and rotatable about an axis and having a screwthread;
a main sleeve axially fixed but rotatable about the axis on the body and formed centered on the axis with a plurality of angled forwardly open guides;
respective clamping jaws displaceable in the guides;
a pusher axially engageable with clamping jaws and axially forwardly displaceable relative to the chuck body to shift the clamping jaws axially forward and radially inward in the respective guides and axially rearwardly displaceable relative to the chuck body to shift the clamping jaws axially rearward and radially outward in the respective guides;
a coupling jaw threadedly engaging the screwthread of the chuck body and engageable with the pusher for axially coupling the coupling jaw to the pusher;
means for coupling the sleeve to the coupling jaw for joint rotation therewith; and
means for locking the sleeve against rotation in one direction relative to the chuck body.

12. The drill chuck defined in claim 11 wherein the locking means includes
a locking sleeve angularly but not axially displaceable on the main sleeve;
an annular array of teeth on the chuck body; and
a locking member carried in the locking sleeve and cammable thereby between a locking position engaged in the array of teeth and a freeing position clear of the array of teeth.

* * * * *